United States Patent
Grichnik et al.

(10) Patent No.: US 8,086,640 B2
(45) Date of Patent: Dec. 27, 2011

(54) SYSTEM AND METHOD FOR IMPROVING DATA COVERAGE IN MODELING SYSTEMS

(75) Inventors: Anthony James Grichnik, Peoria, IL (US); Michael Seskin, Cardiff, CA (US); James Robert Mason, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 652 days.

(21) Appl. No.: 12/155,200

(22) Filed: May 30, 2008

(65) Prior Publication Data
US 2009/0300052 A1     Dec. 3, 2009

(51) Int. Cl.
*G06F 7/00* (2006.01)
*G06F 17/30* (2006.01)

(52) U.S. Cl. ...................... 707/796; 707/804
(58) Field of Classification Search .......... 707/600–831; 700/97; 701/5; 703/2
See application file for complete search history.

(56) References Cited

U.S. PATENT DOCUMENTS

| | | | |
|---|---|---|---|
| 3,316,395 A | 4/1967 | Lavin | |
| 4,136,329 A | 1/1979 | Trobert | |
| 4,533,900 A | 8/1985 | Muhlberger et al. | |
| 5,014,220 A | 5/1991 | McMann et al. | |
| 5,163,412 A | 11/1992 | Neu et al. | |
| 5,262,941 A | 11/1993 | Saladin et al. | |
| 5,341,315 A | 8/1994 | Niwa et al. | |
| 5,386,373 A | 1/1995 | Keeler et al. | |
| 5,434,796 A | 7/1995 | Weininger | |
| 5,539,638 A | 7/1996 | Keeler et al. | |
| 5,548,528 A | 8/1996 | Keeler et al. | |
| 5,561,610 A | 10/1996 | Schricker et al. | |
| 5,566,091 A | 10/1996 | Schricker et al. | |
| 5,585,553 A | 12/1996 | Schricker | |
| 5,594,637 A | 1/1997 | Eisenberg et al. | |
| 5,598,076 A | 1/1997 | Neubauer et al. | |
| 5,604,306 A | 2/1997 | Schricker | |
| 5,604,895 A | 2/1997 | Raimi | |
| 5,608,865 A | 3/1997 | Midgely et al. | |
| 5,666,297 A | 9/1997 | Britt et al. | |
| 5,682,317 A | 10/1997 | Keeler et al. | |
| 5,698,780 A | 12/1997 | Mizutani et al. | |

(Continued)

FOREIGN PATENT DOCUMENTS
EP     1103926     5/2001

(Continued)

OTHER PUBLICATIONS

Simpson et al, Metamodel for computer-based engineering design: Survey & recommendations, Springer UK, 2001, vol. 17, 129-150.*

(Continued)

*Primary Examiner* — Jean B Fleurantin
(74) *Attorney, Agent, or Firm* — Finnegan, Henderson, Farabow, Garrett & Dunner LLP

(57) ABSTRACT

A method for modifying data coverage in a modeling system is disclosed. The method may include obtaining data records relating to a plurality of input variables and one or more output parameters and selecting a plurality of input parameters from the plurality of input variables. The method may further include evaluating a coverage of the data records in a modeling space and modifying the coverage of the data records, if a data coverage condition is detected. The method may also include generating a computational model indicative of interrelationships between the plurality of input parameters and the one or more output parameters based on the data records.

20 Claims, 4 Drawing Sheets

U.S. PATENT DOCUMENTS

| | | | |
|---|---|---|---|
| 5,727,128 A | 3/1998 | Morrison |
| 5,750,887 A | 5/1998 | Schricker |
| 5,752,007 A | 5/1998 | Morrison |
| 5,835,902 A | 11/1998 | Jannarone |
| 5,842,202 A | 11/1998 | Kon |
| 5,914,890 A | 6/1999 | Sarangapani et al. |
| 5,925,089 A | 7/1999 | Fujime |
| 5,950,147 A | 9/1999 | Sarangapani et al. |
| 5,966,312 A | 10/1999 | Chen |
| 5,987,976 A | 11/1999 | Sarangapani |
| 6,086,617 A | 7/2000 | Waldon et al. |
| 6,092,016 A | 7/2000 | Sarangapani et al. |
| 6,119,074 A | 9/2000 | Sarangapani |
| 6,145,066 A | 11/2000 | Atkin |
| 6,195,648 B1 | 2/2001 | Simon et al. |
| 6,199,007 B1 | 3/2001 | Zavarehi et al. |
| 6,208,982 B1 | 3/2001 | Allen, Jr. et al. |
| 6,223,133 B1 | 4/2001 | Brown |
| 6,236,908 B1 | 5/2001 | Cheng et al. |
| 6,240,343 B1 | 5/2001 | Sarangapani et al. |
| 6,269,351 B1 | 7/2001 | Black |
| 6,298,718 B1 | 10/2001 | Wang |
| 6,370,544 B1 | 4/2002 | Krebs et al. |
| 6,405,122 B1 | 6/2002 | Yamaguchi |
| 6,438,430 B1 | 8/2002 | Martin et al. |
| 6,442,511 B1 | 8/2002 | Sarangapani et al. |
| 6,477,660 B1 | 11/2002 | Sohner |
| 6,513,018 B1 | 1/2003 | Culhane |
| 6,546,379 B1 | 4/2003 | Hong et al. |
| 6,584,768 B1 | 7/2003 | Hecker et al. |
| 6,594,989 B1 | 7/2003 | Hepburn et al. |
| 6,698,203 B2 | 3/2004 | Wang |
| 6,711,676 B1 | 3/2004 | Zomaya et al. |
| 6,721,606 B1 | 4/2004 | Kaji et al. |
| 6,725,208 B1 | 4/2004 | Hartman et al. |
| 6,763,708 B2 | 7/2004 | Ting et al. |
| 6,775,647 B1 | 8/2004 | Evans et al. |
| 6,785,604 B2 | 8/2004 | Jacobson |
| 6,810,442 B1 | 10/2004 | Lin et al. |
| 6,823,675 B2 | 11/2004 | Brunell et al. |
| 6,859,770 B2 | 2/2005 | Ramsey |
| 6,859,785 B2 | 2/2005 | Case |
| 6,865,883 B2 | 3/2005 | Gomulka |
| 6,882,929 B2 | 4/2005 | Liang et al. |
| 6,895,286 B2 | 5/2005 | Kaji et al. |
| 6,935,313 B2 | 8/2005 | Jacobson |
| 6,941,287 B1 | 9/2005 | Vaidyanathan et al. |
| 6,952,662 B2 | 10/2005 | Wegerich et al. |
| 6,976,062 B1 | 12/2005 | Denby et al. |
| 7,000,229 B2 | 2/2006 | Gere |
| 7,024,343 B2 | 4/2006 | El-Ratal |
| 7,027,953 B2 | 4/2006 | Klein |
| 7,035,834 B2 | 4/2006 | Jacobson |
| 7,117,079 B2 | 10/2006 | Streichsbier et al. |
| 7,124,047 B2 | 10/2006 | Zhang et al. |
| 7,127,892 B2 | 10/2006 | Akins et al. |
| 7,174,284 B2 | 2/2007 | Dolansky et al. |
| 7,178,328 B2 | 2/2007 | Solbrig |
| 7,191,161 B1 | 3/2007 | Rai et al. |
| 7,194,392 B2 | 3/2007 | Tuken et al. |
| 7,213,007 B2 | 5/2007 | Grichnik |
| 7,356,393 B1 | 4/2008 | Schlatre et al. |
| 7,369,925 B2 | 5/2008 | Morioka et al. |
| 7,787,969 B2 | 8/2010 | Grichnik et al. |
| 7,813,869 B2 | 10/2010 | Grichnik et al. |
| 2002/0014294 A1 | 2/2002 | Okano et al. |
| 2002/0016701 A1 | 2/2002 | Duret et al. |
| 2002/0042784 A1 | 4/2002 | Kerven et al. |
| 2002/0049704 A1 | 4/2002 | Vanderveldt et al. |
| 2002/0103996 A1 | 8/2002 | LeVasseur et al. |
| 2002/0198821 A1 | 12/2002 | Munoz |
| 2003/0018503 A1 | 1/2003 | Shulman |
| 2003/0055607 A1 | 3/2003 | Wegerich et al. |
| 2003/0093250 A1 | 5/2003 | Goebel |
| 2003/0126053 A1 | 7/2003 | Boswell et al. |
| 2003/0126103 A1 | 7/2003 | Chen et al. |
| 2003/0130855 A1 | 7/2003 | Babu et al. |
| 2003/0167354 A1 | 9/2003 | Peppers et al. |
| 2003/0187567 A1 | 10/2003 | Sulatisky et al. |
| 2003/0187584 A1 | 10/2003 | Harris |
| 2003/0200296 A1 | 10/2003 | Lindsey |
| 2004/0030420 A1 | 2/2004 | Ulyanov et al. |
| 2004/0034857 A1 | 2/2004 | Mangino et al. |
| 2004/0059518 A1 | 3/2004 | Rothschild |
| 2004/0077966 A1 | 4/2004 | Yamaguchi et al. |
| 2004/0122702 A1 | 6/2004 | Sabol et al. |
| 2004/0122703 A1 | 6/2004 | Walker et al. |
| 2004/0128058 A1 | 7/2004 | Andres et al. |
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Maurer |
| 2005/0055176 A1 | 3/2005 | Clarke et al. |
| 2005/0091093 A1 | 4/2005 | Bhaskaran et al. |
| 2005/0209943 A1 | 9/2005 | Ballow et al. |
| 2005/0210337 A1 | 9/2005 | Chester et al. |
| 2005/0226495 A1 | 10/2005 | Li |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0229753 A1* | 10/2006 | Seskin et al. ............ 700/97 |
| 2006/0229769 A1* | 10/2006 | Grichnik et al. ............ 701/1 |
| 2006/0229852 A1 | 10/2006 | Grichnik et al. |
| 2006/0229854 A1* | 10/2006 | Grichnik et al. ............ 703/2 |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0247798 A1 | 11/2006 | Subbu et al. |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0118487 A1* | 5/2007 | Grichnik et al. ............ 705/400 |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |
| 2008/0154811 A1 | 6/2008 | Grichnik et al. |
| 2008/0201054 A1 | 8/2008 | Grichnik et al. |
| 2009/0024367 A1 | 1/2009 | Grichnik et al. |
| 2009/0118841 A1 | 5/2009 | Grichnik et al. |
| 2009/0132216 A1 | 5/2009 | Grichnik et al. |
| 2010/0250202 A1 | 9/2010 | Grichnik et al. |

FOREIGN PATENT DOCUMENTS

| | | |
|---|---|---|
| EP | 1367248 | 12/2003 |
| EP | 1418481 | 5/2004 |
| JP | 10-332621 | 12/1998 |
| JP | 11-351045 | 12/1999 |
| JP | 2002-276344 | 9/2002 |
| WO | WO97/42581 | 11/1997 |
| WO | WO02/057856 | 7/2002 |
| WO | WO2006/017453 | 2/2006 |

OTHER PUBLICATIONS

Bandte et al., Viable designs through a joint probabilistic estimation technique, 1999, Google, 1-11.*

Poosala et al., Improved Histograms for Selectivity Estimation of Range Predicates, Jun. 1996, ACM, vol. 25, 296-305.*

Gotardo et al., range image segmentation into planar and quadric surfaces using an improved robust estimator and genetic algorithm, Dec. 6, 2004, Google, vol. 34, 2303-2316.*

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Nueral Networks," SAE Technical Paper Series, 2003-01-3228, Oct. 27-30, 2003 (11 pages).

Chau et al., "Use of runs test to access cardiovascular autonomic function in diabetic subjects" Abstract, Diabetes Care, vol. 17, Issue 2, pp. 146-148, available at http://care.diabetesjournals.org/cgi/content/abstract/17/2/146), 1994.

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Electronics Engineers, "Practical Introduction to simulation optimization," Proceedings of the 2003 Winter Simulation Conference, New Orleans, Dec. 7-10, 2003, NY: IEEE, US, vol. 2 of 2. Conf. 36, pp. 71-78, ISBN: 0-7803-8131-9.

Galperin, G., et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on InformationTechnology in Biomedicine, vol. 7. No. 3, Sep. 2003 pp. 153-162.

Grichnik et al., "An Improved Metric for Robust Engineering," Proceedings of the 2007 International Conference on Scientific Computing, Las Vegas, NV (4 pages).

Holland, John H., "Genetic Algorithms," Scientific American, Jul. 1992, pp. 66-72.

Hughes at al , "Linear Statistics for Zeros of Riemann's Zeta Function", C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al,, "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Office Action issued in U.S. Appl. No. 11/477,515, dated May 12, 2009, 23 pages.

Office Action issued in U.S. Appl. No. 11/477,515, dated Feb. 3, 2010, 10 pages.

Notice of Allowability in U.S. Appl. No. 11/477,515, dated Jul. 2, 2010, 5 pages.

Office Action issued in U.S. Appl. No. 11/101,498, dated Sep. 7, 2007, 42 pages.

Office Action issued in U.S. Patent Application No. 11/101,498, dated Mar. 14, 2008, 45 pages.

Office Action issued in U.S. Appl. No. 11/101,498, dated Sep. 16, 2008, 42 pages.

Simpson et al., "Metamodels for Computer-Based Engineering Design: Survey & Recommendations," Engineering with Computers, 2001, vol. 17, pp. 129-150.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modelling of the Emissions and Performance of a Heavy-Duty Diesel Engine," Proc. Instu. Mech. Engrs., vol. 214, Part D (2000), pp. 111-126.

Traver, Michael L. et al., "A Neural Network-Based Virtual $NO_x$ Sensor for Diesel Engines," West Virginia University, Mechanical and Aerospace Engineering Dept., Morgantown, WV 26506-6101, 6106, 7 pages (2000).

Traver, Michael L. et al., "Neural Network-Based Diesel Engine Emissions Prediction Using in-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi System," Technometrics, Feb. 2003, vol. 45, No. 1 (15 pages).

Wu et al., "Cam-Phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

* cited by examiner

SYSTEM AND METHOD FOR IMPROVING DATA COVERAGE IN MODELING SYSTEMS

TECHNICAL FIELD

This disclosure relates generally to modeling systems and, more particularly, to improving data coverage for modeling systems.

BACKGROUND

Computational models, particularly process models, are often built to capture complex interrelationships between input parameters and output parameters. Various techniques, such as neural networks, may be used in such models to establish mathematical relationships between input parameters and output parameters. Once the models are established, they may provide predictions of the output parameters based on the input parameters.

One such modeling task may include the construction of a virtual sensor network for a particular type of machinery. Using these applications, an engineer can construct computational models, and use them to analyze the behavior of data or to predict new data. In a modeling system, training data are usually used to select and train the model. Training data may be collected by measurements, or generated by computer simulations. During the modeling process, a plurality of models may be fitted to the training data, and a model that best represents the training data may be selected. Further, independent parameters of the best model may also be determined based on the training data. For example, a normal distribution may be selected as the best statistical representation for an independent parameter to a model for a given set of training data, and independent parameters including a mean and a standard deviation of the normal distribution may be determined for each independent parameter feeding into the model.

In order to construct a good computational model, data quality, data coverage, and data structure of the training data become important. Certain analytical tools have been developed that enable engineers to evaluate the data quality and the data structure. For example, data quality issues may be identified by inspecting the tractability certificates of systems producing the data. Data structure issues may be detected with key fields or time records when attempting to combine data from two or more systems. However, detecting data coverage issues remains an elusive task.

For example, training data that distribute uniformly in the modeling space may lead to an efficient and accurate modeling. However, collected or simulated training data are usually denser in certain regions of the modeling space than in other regions. As a result, such a data coverage condition may lead to models that are insufficiently broad to cover the range of expected inputs, or do not generalize well into underrepresented regions of a solution space. This can have unexpected or unintended consequences for control and diagnostic systems that rely on virtual sensor network technologies. In addition, the modeling process may take an unacceptably long time to converge. Thus, there is a need for modeling systems to evaluate and improve the coverage of the training data, before the data are used for the modeling process.

Systems and methods for processing training data for a statistical classification application is described in U.S. Patent Publication No. 2005/0226495 to Li ("the '495 publication"). According to the method described in the '495 publication, confidence values may be calculated for training data elements to identify the probabilities of the training data elements belonging to identified classes. Further, an interactive scatter plot may be generated using the calculated confidence values and the user may be able to select training data elements from the scatter plot.

Although the method described in the '495 publication may be effective for selecting training data, it may be problematic. For example, the method described in the '495 publication is only able to remove training data elements that are misclassified in the scatter plot, but fails to improve the overall coverage of training data in the modeling space. Furthermore, the method described in the '495 publication can only select training elements from an existing dataset, but fails to provide suggestions of additional cases for generating or obtaining more training data to correct coverage issues. In addition, the method described in the '495 publication relies on calculating confidence values for each data element and generating scatter plot for each selecting process, and thus, may be time and/or computational consuming. For example, the method in the '495 publication may have to generate $2^N$ scatter plots for manual evaluation, where N is the number of independent parameters under consideration. Practical problems in this space could have hundreds of candidate parameters, rendering a manual search such as the one described in the '495 publication impractical The disclosed system and method for modifying data coverage in modeling systems are directed towards overcoming one or more of the shortcomings set forth above.

SUMMARY

One aspect of the present disclosure includes a method for modifying data coverage in a modeling system. The method may include obtaining data records relating to a plurality of input variables and one or more output parameters and selecting a plurality of input parameters from the plurality of input variables. The method may further include evaluating a coverage of the data records in a modeling space and modifying the coverage of the data records, if a data coverage condition is detected. The method may also include generating a computational model indicative of interrelationships between the plurality of input parameters and the one or more output parameters based on the data records.

Another aspect of the present disclosure includes a computer-based modeling system. The modeling system may include a database containing data records relating to a plurality of input variables and one or more output parameters and a processor coupled to the database. The processor may be configured to obtain data records relating to the plurality of input variables and one or more output parameters and to select a plurality of input parameters from the plurality of input variables. The processor may also be configured to evaluate a coverage of the data records in a modeling space and modify the coverage of the data records, if a data coverage condition is detected. Further, the processor may be configured to generate a computational model indicative of interrelationships between the plurality of input parameters and the one or more output parameters based on the data records.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
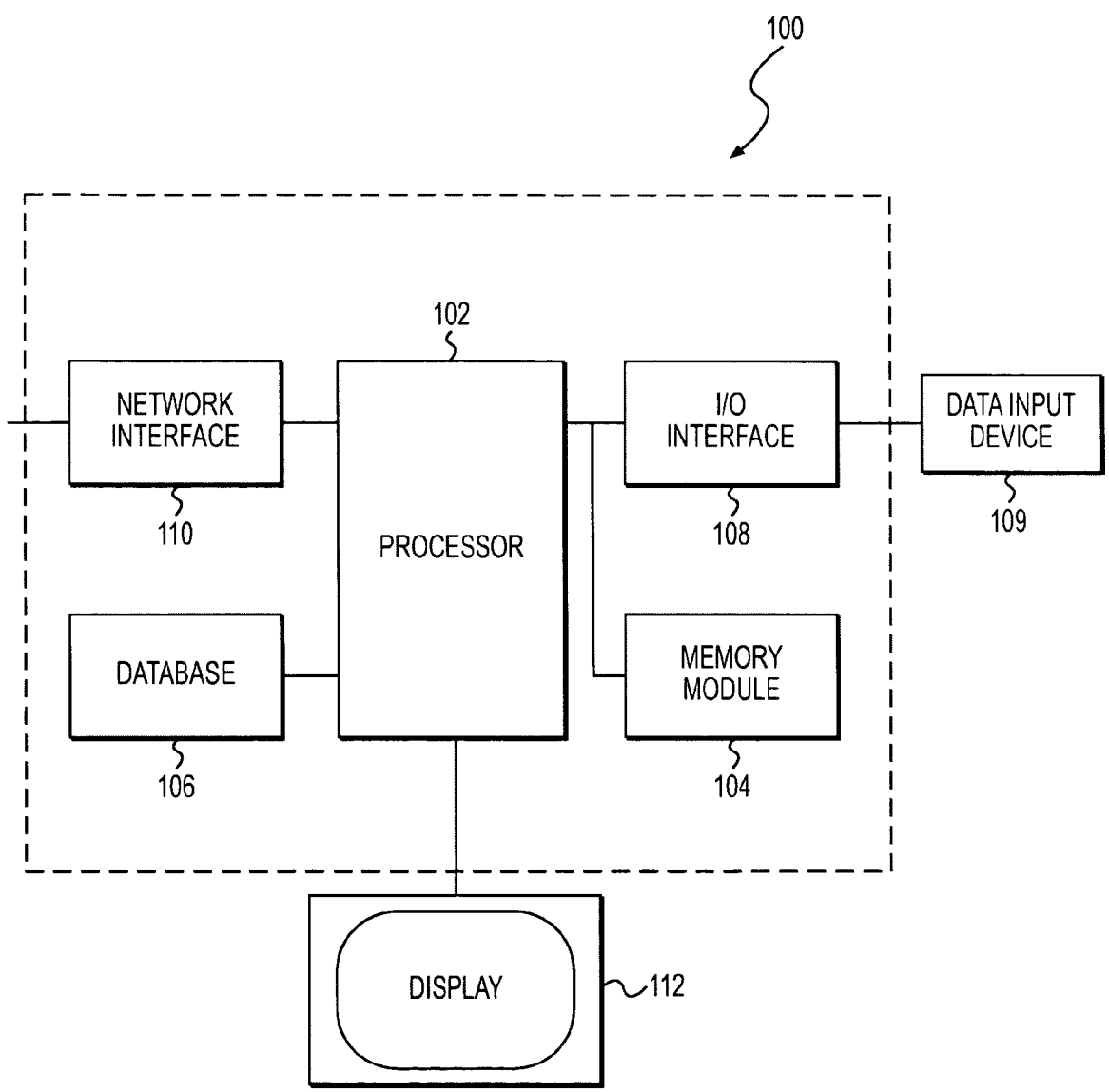
FIG. 1 provides a block diagram representation of a modeling system according to an exemplary disclosed embodiment of the present disclosure.

FIG. 1 provides a block diagram representation of a modeling system 100 according to an exemplary disclosed embodiment of the present disclosure. Modeling system 100 may be used for various purposes and to perform various tasks. As an example, modeling system 100 may be used for generating a design of a product. Non-limiting examples of products may include machines, engines, automobiles, aircraft, boats, appliances, electronics, and any sub-components, sub-assemblies, or parts thereof. A product design may be represented as a set of input parameter values. These parameters may correspond to dimensions, tolerances, moments of inertia, mass, material selections, or any other characteristic affecting one or more properties of the product. The disclosed modeling system 100 may be configured to provide a probabilistic product design such that input parameters can be expressed as nominal values and corresponding statistical distributions. Similarly, the product design may include nominal values for one or more output parameters and corresponding statistical distributions. The statistical distributions of the output parameters may provide an indication of the probability that the product design complies with a desired set of output requirements.

As another example, modeling system 100 may be used for providing indirect sensor measurements in addition or in place of the direct measurements made by physical sensors. For instance, modeling system 100 may be a virtual sensor network. The virtual sensor network may include a plurality of virtual sensors, each of which may have a model type, at least one input parameter, and at least one output parameter. The disclosed modeling system 100 may be configured to construct a model considering the dependencies among the plurality of virtual sensors. Modeling system 100 may further determine one or more virtual sensor output parameters using the model, based on operational information of the plurality of virtual sensors.

Modeling system 100 may include a processor 102, a memory module 104, a database 106, an I/O interface 108, and a network interface 110. Modeling system 100 may also include a data input device 109, and a display 112. Any other components suitable for receiving and interacting with data, executing instructions, communicating with one or more external workstations, displaying information, etc. may also be included in modeling system 100.

Processor 102 may be a central processing unit ("CPU"). Processor 102 may also include any appropriate type of general purpose microprocessor, digital signal processor, or microcontroller. Processor 102 may execute sequences of computer program instructions to perform various processes that will be explained later. Processor 102 may be configured as a separate processor module dedicated to modeling. Alternatively, processor 102 may be configured as a shared processor module for performing other functions unrelated to modeling. Processor 102 may also include one or more printed circuit boards, and/or a microprocessor chip.

Memory module 104 may include one or more memory units including, but not limited to, a ROM, a flash memory, a dynamic RAM, and a static RAM. Memory module 104 may be configured to store information accessed and used by processor 102. Database 106 may include any type of appropriate database containing information relating to characteristics of input parameters, output parameters, computational models, and/or any other control information. Database 106 may also contain data records that are used to construct the computational models.

I/O interface 108 may be connected to a data input device 109 to provide data and control information to modeling system 100. Data input device 109 may be provided for a user to input information to modeling system 100. For example, data input device 109 may include a keyboard, a switch, a mouse, and/or a touch screen. Network interface 110 may include any appropriate type of network adaptor capable of communicating with other computer systems based on one or more communication protocols. Display 112 may include any type of device (e.g., CRT monitors, LCD screens, etc.) capable of graphically depicting information.

Figure 2:
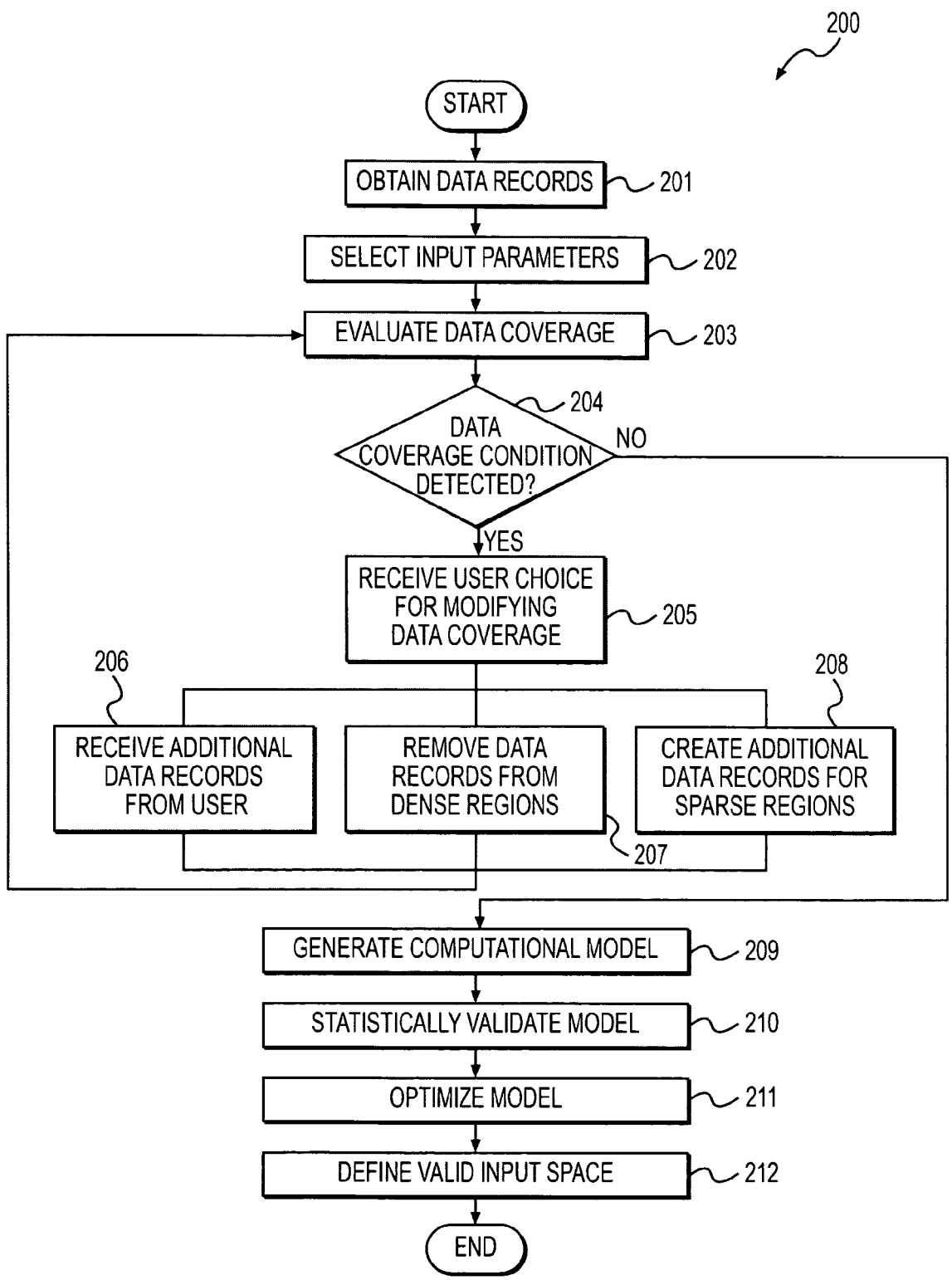
FIG. 2 illustrates a flow chart representing an exemplary operation process of a modeling system, consistent with certain disclosed embodiments shown in FIG. 1.

FIG. 2 illustrates a flow chart representing an exemplary operation process 200 of modeling system 100, consistent with certain disclosed embodiments shown in FIG. 1. At step 201, modeling system 100 may obtain data records relating to input variables and output parameters. The data records may reflect characteristics of the input parameters and output parameters, such as statistical distributions, normal ranges, and/or tolerances, etc. For each data record, there may be a set of output parameter values that corresponds to a particular set of input variable values. The data records may be pre-collected data that has been stored, for example, in database 106. The data records may be input by a user via data input device 109. Alternatively or additionally, the data records may be computer generated or empirically collected through testing of actual products.

In one embodiment, the data records may be generated in the following manner by processor 102. For a particular task to be performed, a modeling space of interest may be identified. A plurality of sets of random values may be generated for various input variables that fall within the desired modeling space. These sets of random values may be supplied to at least one simulation algorithm to generate values for one or more output parameters related to the input variables. The at least one simulation algorithm may be associated with, for example, systems for performing finite element analysis, computational fluid dynamics analysis, radio frequency simulation, electromagnetic field simulation, electrostatic discharge simulation, network propagation simulation, discrete event simulation, constraint-based network simulation, or any other appropriate type of dynamic simulation.

As part of step 201, the data records may also be pre-processed. For example, processor 102 may pre-process the data records to clean up the data records for obvious errors and to eliminate redundancies. Processor 102 may remove approximately identical data records and/or remove data records that are out of a reasonable range in order to be meaningful for model generation and optimization. For example, for randomly generated data records, any cases violating variable covariance terms may be eliminated as per Latin Hypercube processes known in the art.

After the data records have been pre-processed, processor 102 may then select proper input parameters at step 202 by analyzing the data records. The data records may include many input variables. In certain situations, for example, where the data records are obtained through experimental observations, the number of input variables may exceed the number of the data records and lead to sparse data scenarios. In these situations, the number of input variables may need to be reduced to create computational models within practical computational time limits and that contain enough degrees of freedom to map the relationship between inputs and outputs. In certain other situations, however, where the data records are generated by processor 102 using simulation algorithms, there may be less of a risk that the number of input variables exceeds the number of data records. That is, in these situations, if the number of input variables exceeds the number of data records, more data records may be generated using the simulation algorithms. Thus, for computer generated data records, the number of data records can be made to exceed, and often far exceed, the number of input variables. For these situations, the input parameters selected for use in step 202 may correspond to the entire set of input variables.

Where the number on input variables exceeds the number of data records, processor 102 may select input parameters at step 202 according to predetermined criteria. For example, processor 102 may choose input parameters by experimentation and/or expert opinions. Alternatively, in certain embodiments, processor 102 may select input parameters based on a Mahalanobis distance between a normal data set and an abnormal data set of the data records. The normal data set and abnormal data set may be defined by processor 102 by any suitable method. For example, the normal data set may include characteristic data associated with the input parameters that produce desired output parameters. On the other hand, the abnormal data set may include any characteristic data that may be out of tolerance or may need to be avoided. The normal data set and abnormal data set may be predefined by processor 102.

Mahalanobis distance may refer to a mathematical representation that may be used to measure data profiles based on covariances between parameters in a data set. Mahalanobis distance differs from Euclidean distance in that Mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 102 may select a desired subset of input parameters such that the Mahalanobis distance between the normal data set and the abnormal data set is maximized or optimized. A genetic algorithm may be used by processor 102 to search the input parameters for the desired subset with the purpose of maximizing the Mahalanobis distance. Processor 102 may select a candidate subset of the input parameters based on a predetermined criteria and calculate a Mahalanobis distance $MD_{normal}$ of the normal data set and a Mahalanobis distance $MD_{abnormal}$ of the abnormal data set. Processor 102 may also calculate the Mahalanobis distance between the normal data set and the abnormal data (i.e., the deviation of the Mahalanobis distance $MD_x = MD_{normal} - MD_{normal}$). Other types of deviation metrics, however, may also be used.

Processor 102 may select the candidate subset of the input parameters if the genetic algorithm converges (i.e., the genetic algorithm finds the maximized or optimized Mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

After input parameters are selected in step 202, processor 102 may evaluate the coverage of the data records in the modeling space (step 203). The modeling space may be a multi-dimensional space depending on the number of input parameters selected in step 202. Each dimension of the modeling space may correspond to an input parameter, and the span of each dimension may correspond to the range of the respective input parameter. Depending on the data collection or simulation process, data records may not cover the modeling space uniformly. For example, certain regions of the modeling space may have sparser data coverage than other regions. Non-uniform data coverage may indicate that the covariance between input parameters is not uniform throughout the modeling space, and as a result, computational models that are constructed based on such data records may be inaccurate and less representative to the real nature of the task.

Figure 3:
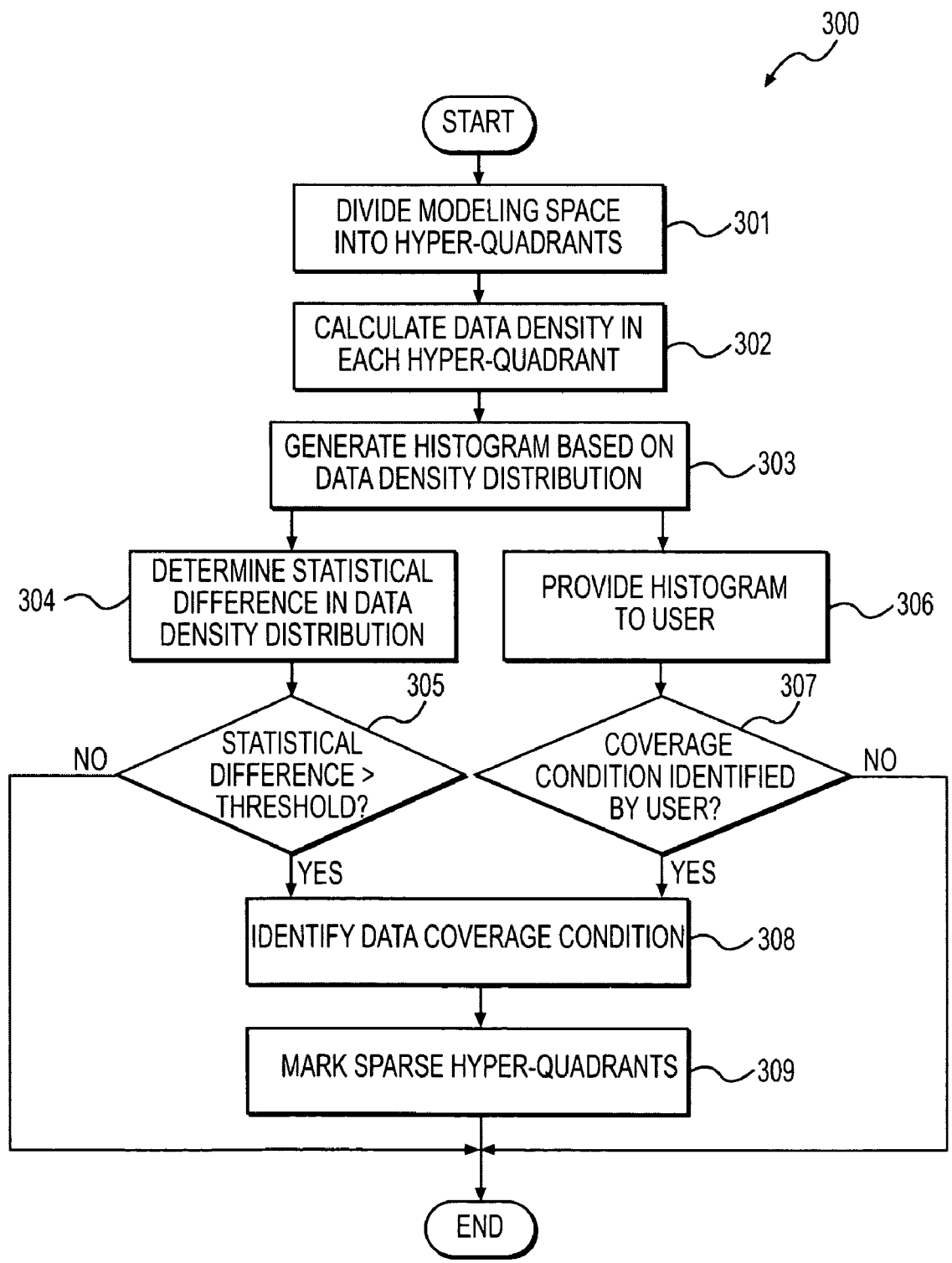
FIG. 3 illustrates a flowchart of an exemplary hyper-quadrant density inspection process for evaluating data coverage, consistent with certain disclosed embodiments.

In one embodiment, at step 203, processor 102 may determine data densities for the different regions in the modeling space and determine a distribution of the data density. Processor 102 may identify data coverage conditions in the modeling space and may motivate certain modifications to be made to the data coverage. A data coverage condition may be a condition where the non-uniformity of the data density exceeds a certain level. Consistent with one embodiment, the non-uniformity of the data density may be measured automatically by processor 102 with certain metrics. For example, processor 102 may determine a statistical difference from the distribution of the data density and a significant statistical difference may indicate a data coverage condition. Further, the statistical difference may also be used to identify regions that have sparse data records. Consistent with another embodiment, the non-uniformity of the data density may also be determined by a user and then input to processor 102. In addition to non-uniformity, sparsity of data may also constitute a data coverage condition. If the amount of data falls below a designated level, this could be considered as a data coverage condition that may trigger modification to the data coverage. Consistent with one embodiment, a hyper-quadrant density inspection process 300 may be used to evaluate the coverage of the data records in the modeling space, as shown in FIG. 3. Details of hyper-quadrant density inspection process 300 will be described in connection with that figure.

Based on the data coverage evaluation in step 203, processor 102 may determine if a data coverage condition is detected (step 204). For example, a data coverage condition may be detected by hyper-quadrant density inspection process 300 if the statistical difference is high. If a data coverage condition is detected (step 204: Yes), data coverage may be recommended before a model is constructed based on the data records. At step 205, modeling system 100 may receive a user choice on how to modify the data coverage. In one embodiment, a list of choices may be provided to the user on display 112 and the user may choose one or more choices on the list. For example, the list of choices may include having the user provide additional data records for sparse regions in the modeling space (hereon referred to as "choice No. 1"). The list of choices may further include authorizing processor 102 to remove data records from dense regions in the modeling space (hereon referred to as "choice No. 2"). The list of choices may also include authorizing processor 102 to create additional data records for sparse regions in the modeling space (hereon referred to as "choice No. 3").

It is contemplated that the list may include additional, fewer, and/or different choices than those listed above. It is understood that the type and number of listed choices are exemplary only and not intended to be limiting. A user decision regarding the choices may be received via data input device 109. The user may choose one or more choices on the list. For example, the user may want processor 102 to remove data records from dense regions and also create additional data records for sparse regions, and accordingly, both choice No. 2 and choice No. 3 may be selected.

If choice No. 1 is selected by the user, processor 102 may receive additional data records for sparse regions from the user (step 206). For example, the user may generate experimental observations to collect additional data records, especially in those sparse regions in the modeling space. These additional data records may be entered into modeling system 100 via data input device 109.

If choice No. 2 is selected by the user, processor 102 may remove certain data records from dense regions (step 207). For example, in some cases, data records may be well over-collected or over-generated for the number of input variables available. As a result, the user may choose to have modeling system 100 automatically remove data records from the dense regions such that the overall data coverage is at a desired level. Various algorithms may be used to determine which data records are to be removed. In one embodiment, at step 207, processor 102 may randomly remove data records in dense regions identified as part of step 203. During the removing process, data coverage in the entire modeling space may be constantly monitored, such that the removing process may stop once the data coverage is modified to an extent that no data coverage condition is detected.

If choice No. 3 is selected by the user, processor 102 may create additional data records for dense regions (step 208). In some cases, the user may not wish to remove any existing data records and it may be difficult for the user to collect additional data records in the sparse regions. Processor 102 may automatically generate data records using algorithms such as a symmetric random scatter (SRS) process, which are described in greater detail in connection with FIG. 4.

Once step 206, 207, 208 or any combination of them are performed for modifying the data coverage of the modeling space, process 200 may return to step 203 and re-evaluate the data coverage. Steps 203-208 may be iterated as long as there is still data coverage condition detected in step 204. Once data coverage is modified to the extent that no data coverage condition is detected (step 204: no), process 200 may go to step 209 to generate a computational model.

At step 209, processor 102 may generate a computational model to build interrelationships between the input parameters and output parameters based on the data records (step 209). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using the data records. For example, the neural network computational model may include a relationship between output parameters (e.g., engine power, engine efficiency, engine vibration, etc.) and input parameters (e.g., cylinder wall thickness, cylinder wall material, cylinder bore, etc). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 102 may statistically validate the computational model (step 210). Statistical validation may refer to an analyzing process to compare outputs of the neural network computational model with actual outputs to determine the accuracy of the computational model. Part of the data records may be reserved for use in the validation process. Alternatively, processor 102 may generate simulation or test data for use in the validation process. Once trained and validated, the computational model may be used to determine values of output parameters when provided with values of input parameters.

Further, processor 102 may optimize the model by determining desired distributions of the input parameters based on relationships between the input parameters and desired distributions of the output parameters (step 211). In one embodiment, processor 102 may analyze the relationships between distributions of the input parameters and desired distributions of the output parameters (e.g., constraints provided to the model that may represent a state of compliance of the solution). Processor 102 may then run a simulation of the computational model to find statistical distributions for an individual input parameter. That is, processor 102 may separately determine a distribution (e.g., mean, standard variation, etc.) of the individual input parameter corresponding to the ranges of the output parameters representing a compliance state for the product. Processor 102 may then analyze and combine the desired distributions for all the individual input parameters to determined desired distributions and characteristics for the input parameters.

Alternatively, in another embodiment, processor 102 may identify desired distributions of input parameters simultaneously to maximize the probability of obtaining desired outcomes (i.e., to maximize the probability that a certain solution is compliant with the desired requirements). In certain embodiments, processor 102 may simultaneously determine desired distributions of the input parameters based on zeta statistic. Zeta statistic may indicate a relationship between input parameters, their value ranges, and desired outcomes. Processor 102 may identify a desired distribution of the input parameters such that the zeta statistic of the neural network computational model is maximized or optimized.

After the model has been optimized (step 211), processor 102 may define a valid input space (step 212) representative of the optimized model. This valid input space may represent the nominal values and corresponding statistical distributions for each of the selected input parameters. For example, to implement a task modeled by modeling system 100, values for the input parameters selected within the valid input space would maximize the probability of achieving a compliance state according to the constraints provided to the model.

FIG. 3 illustrates a flowchart of an exemplary hyper-quadrant density inspection process 300 for evaluating data coverage, consistent with certain disclosed embodiments. At step 301, the modeling space of interest may be divided into a plurality of hyper-quadrants. For a particular task to be performed, the modeling space of interest may have multiple dimensions, each dimension corresponding to an input parameter. The span of each dimension may correspond the range of each input parameter. Processor 102 may break the range of each input parameter into several sub-ranges. Processor 102 may then select one sub-range for each input parameter, and map the combination set of the selected sub-ranges onto the modeling space. Accordingly, a hyper-quadrant may be a region in the model space that corresponds to this combination set.

Take a two-dimensional space as an example. Suppose the engine speed and the engine load are the two input parameters, and suppose the engine speed may have a range of [1, 6] kRPM, and the engine load may have a range of [0.25, 1] calculated load. The range of the engine speed may be broken into five sub-ranges [1, 2), [2,3), [3,4), [4,5), and [5,6], and the range of the engine load may be broken into three sub-ranges [0.25,0.5), [0.5,0.75), and [0.75,1]. As such, the entire modeling space may be divided into fifteen hyper-quadrants (in this case, the hyper-quadrants are rectangles). Each hyper-quadrant may correspond to the combination of a sub-range in the engine speed dimension and a sub-range in the engine load dimension. For example, a hyper-quadrant at the upper-right corner of the modeling space may correspond to the [5,6] engine speed sub-range and the [0.75,1] engine load sub-range.

The size and shape of the hyper-quadrants may depend on the resolution at which each input parameter range is broken down. Consequently, the number of hyper-quadrants generated in a modeling space may depend on the number of dimensions of the modeling space, and number of sub-ranges in each dimension. For example, if the modeling space has N dimensions, and each dimension is split at its midpoint, a total of $2^N$ hyper-quadrants may be generated for evaluation.

At step 302, processor 102 may calculate data density in each hyper-quadrant. In one embodiment, processor 102 may count the data records or vectors in each hyper-quadrant. Based on the calculated data densities, a histogram may be generated (step 303). A histogram may be a graphical display of the data density distribution, i.e., frequencies that the data densities fall into each of several specified categories. For example, the histogram may have a horizontal axis that represents categories of data density and a vertical axis that represents the number of hyper-quadrants that have data densities falling into each category.

The histogram may provide a graphical view for the data density distribution. For example, if the data records distribute uniformly in the modeling space, data densities of all the hyper-quadrants may be close to each other and may all fall into the same category. As a result, the histogram may show a single spike, with nearly all the hyper-quadrants falling in a certain category and nearly no hyper-quadrants in the other categories. As another example, if the data densities conform to a uniform distribution, all the data density categories in the histogram may correspond to bars having the same height. In other words, the histogram may have a flat contour. The wide spread of the histogram may suggest a data coverage condition.

With the calculated data densities and generated histogram, a statistical difference may be determined (step 304). Consistent with one embodiment, processor 102 may determine the statistical difference based on the histogram. For example, processor 102 may determine the statistical difference as the spread of the data density distribution. Alternatively, processor 102 may determine the statistical difference as the standard deviation of the data density distribution, and normalize it with the mean of the distribution. Processor 102 may also identify two or more peaks in the histogram, and determine the statistical difference as the distance between the two farthest peaks.

At step 305, the statistical difference may be compared to a threshold. The threshold may be determined by processor 102 based on the need of the task, or alternatively, entered by the user via data input device 109. If the statistical difference exceeds the threshold (step 305: Yes), processor 102 may identify a data coverage condition (step 306). Otherwise, if the statistical difference is below the threshold (step 305: Yes), processor 102 may determine that the data records do not have a data coverage condition and process 300 may terminate.

In certain embodiments, if the statistical difference exceeds the threshold (step 305: Yes), processor 102 may further examine the histogram to determine if the statistical difference is of concern. For example, processor 102 may examine the hyper-quadrants with data densities that fall into those sparse density categories in the histogram. Processor 102 may then determine if the low data densities in these hyper-quadrants are normal given the nature of the task being modeled. In certain cases, it may be, by design, difficult to obtain data records in these regions of the modeling space. For example, if speed and load of a typical internal combustion engine are selected in step 202 as two input parameters, data records in the region corresponding to very low speed and very high load in the modeling space may be difficult or sometimes impossible to obtain, since an engine may not be able to physically operate under these conditions. Under such circumstances, although the statistical difference may exceed the threshold, processor 102 may still determine that the data records do not have a data coverage condition and process 300 may terminate.

Alternatively or additionally to steps 304-305, processor 102 may provide the histogram to the user via display 112 (step 306). The user may determine if a data coverage condition exists based on the histogram. For example, the user may determine the non-uniformity of the data density based on the histogram. In one embodiment, the user may identify the data coverage condition and notify modeling system 100 of the condition via data input device 109. Based on the notification, processor 102 may determine if a data coverage condition is identified by the user (step 307). Accordingly, processor 102 may identify a data coverage condition (step 308), if the condition is identified by the user (step 307: Yes), or otherwise (step 307: No), processor 102 may determine that the data records do not have a data coverage condition and process 300 may terminate.

After a data coverage condition is identified (step 308), processor 102 may mark sparse hyper-quadrants with data densities below a density threshold (step 309). Consistent with one embodiment, processor 102 may examine the histogram, and mark those hyper-quadrants that fall into categories corresponding to data densities below the density threshold. Consistent with another embodiment, processor 102 may examine each hyper-quadrant and mark it sparse if the associated data density is below the density threshold. After the sparse hyper-quadrants are marked (step 309), process 300 may terminate.

Figure 4:
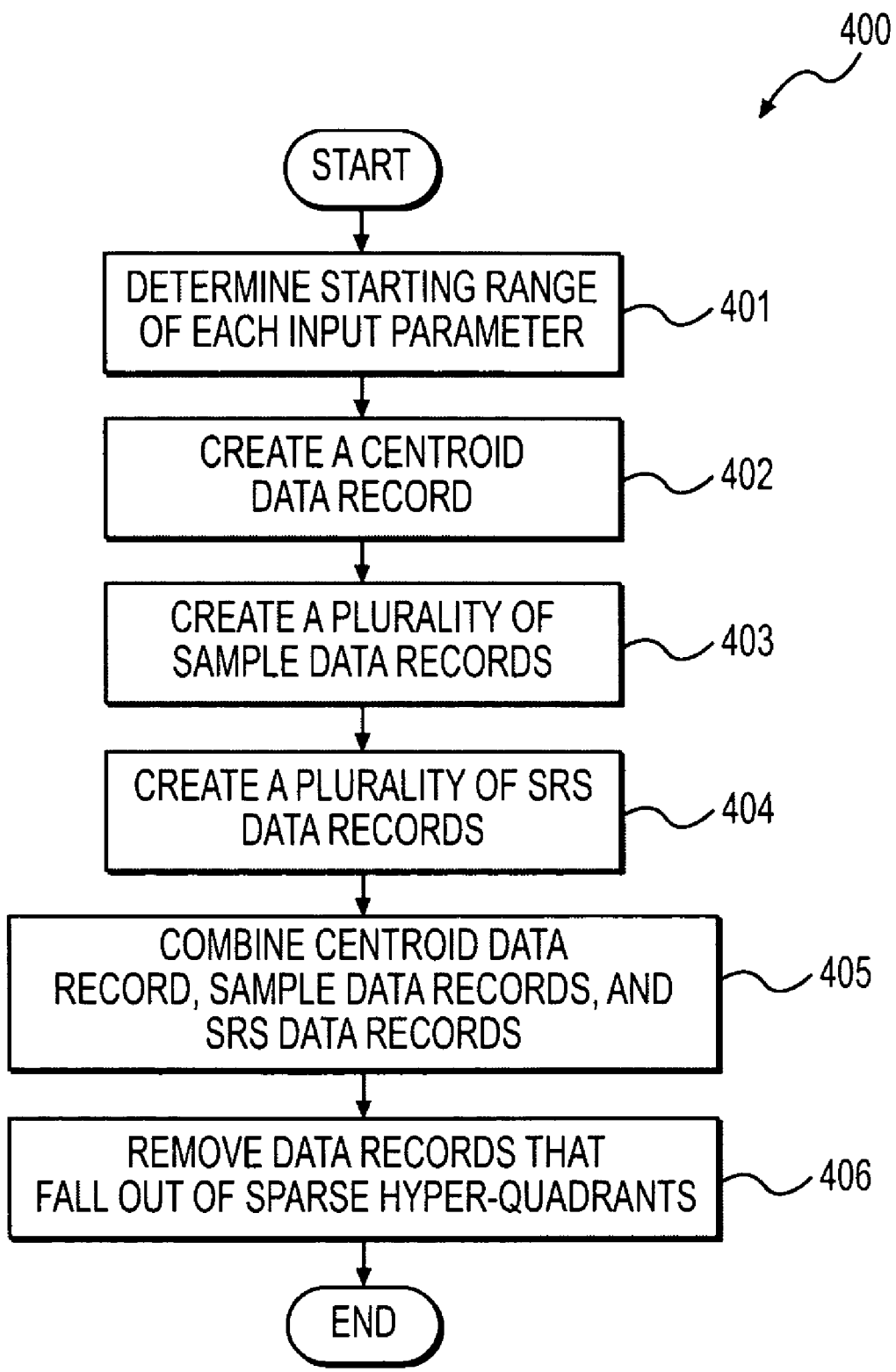
FIG. 4 illustrates a flowchart of an exemplary symmetric random scatter process for modifying data coverage, consistent with certain disclosed embodiments.

Various algorithms may be used to modify the data coverage in the sparse hyper-quadrants, as marked in step 309 of FIG. 3. FIG. 4 illustrates a flowchart of an exemplary symmetric random scatter process 400 for modifying data coverage, consistent with certain disclosed embodiments. A symmetric scatter, as used herein, may refer to a mathematical object resulting from a symmetric transformation of an original mathematic object. The original mathematic object may include any appropriate mathematical object, such as polynomials, vectors, shapes, or discrete mathematical objects, etc. The symmetric transformation may include any appropriate type of mathematical operation, such as mirroring, geometrical transformation, or space/vector transformation, etc. A symmetric random scatter may refer to the symmetric scatter of a random original mathematical object.

As shown in FIG. 4, at the beginning of the SRS process, processor 102 may obtain a starting range for each of the input parameters (step 401). Processor 102 may obtain the starting range by analyzing the select data records of the input parameters. The processor 102 may also obtain the starting range from other applications or processes associated with the input parameters. After the starting range for each of the input parameters is obtained (step 401), processor 102 may create a centroid data record of the input parameters (step 402). In one embodiment, the centroid data record may be determined as a mean of the input parameters. The mean may include any appropriate mathematical means of the input parameters, such as statistical means, or geometric means, etc. For example, the centroid data record may include a midpoint of each of the input parameters. Other types of means, however, may also be used.

The starting range of each input parameter may define an input space (i.e., all ranges or possible values of the input parameters), the centroid data record may then be referred to as a center of the input space. After the centroid data record is created (step 402), processor 102 may create a plurality of sample data records within the starting range (step 403). The sample data records may include any data record having a value for each input parameter from the starting range. Processor 102 may create the sample data records in various ways. In certain embodiments, the sample records may be created randomly by processor 102. The total number of the sample data records may be determined based on a particular application. For example, a total of approximately 10 sample data records may be created for the applications described in this disclosure. Other numbers of sample data records, however, may also be used.

Further, processor 102 may create a plurality of SRS data records corresponding to the sample data records (step 404). To create the SRS data records, processor 102 may calculate an SRS for each sample data record. That is, each sample data record may be an original mathematic object and the SRS of each sample data record may be a symmetric vector opposite of each original mathematic object (e.g., a vector) with respect to the centroid data record (e.g., the center of the input space). For example, an original two-dimensional vector (1,1) may have a symmetric scatter of (−1, −1) with respect to a centroid of (0, 0). Because the SRS data records may be symmetric scatters of the sample data records, the combination of the SRS data records, the sample data records, and the centroid data record may reflect a random part of the starting range centered at the mean of the input parameters.

After creating the plurality of SRS data records, processor 102 may combine the SRS data records, the sample data records, and the centroid data record as the candidate data records (step 405). Processor 102 may then remove candidate data records that fall out of sparse hyper-quadrants (step 406). For example, processor 102 may map the candidate data records onto the modeling space and determine if they fall into those sparse hyper-quadrants marked in step 309 of FIG. 3. The remaining data records after the removal step may be combined with the existing data records.

INDUSTRIAL APPLICABILITY

The disclosed systems and methods may efficiently provide data coverage evaluation and modification in a modeling system. Based on the disclosed system, data coverage condition may be detected by using a hyper-quadrant density inspection process. Further, if a data coverage condition is detected, the coverage may be modified in various ways or their combinations. With the modified data coverage, the robustness and accuracy of the modeling process may be significantly modified.

Furthermore, unlike the method described in the '495 publication that is only able to select training elements from an existing dataset, the disclosed systems and methods are capable of automatically creating additional data records to modify the data coverage. For example, additional data records may be created in the sparse regions of the modeling space, using a symmetric random scatter process. This additional feature may further enhance the accuracy of the modeling process.

In addition, the disclosed method for modifying data coverage in a modeling system may be more efficient than traditional methods. The disclosed method may detect data coverage conditions via a histogram, which is generated based on simple calculations of data densities. Moreover, the disclosed system may provide options to a user for modifying the data coverage, including the option to have the modeling system automatically generate additional data records using an efficient algorithm. Such a computer-based data generating process may significantly reduce the time and inconvenience to the user, compared to a physical data collecting process.

It will be apparent to those skilled in the art that various modifications and variations can be made to the disclosed modeling system 100 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for modifying data coverage in a modeling computer system, comprising:
   obtaining data records relating to a plurality of input variables and one or more output parameters;
   selecting a plurality of input parameters from the plurality of input variables;
   evaluating, by a processor of the modeling computer system, a coverage of the data records in a modeling space by determining a data density of the data records in the modeling space, the evaluating including:
     dividing the modeling space into a plurality of hyper-quadrants;
     calculating a data density for each hyper-quadrant based on a number of data records in the respective hyper-quadrant;
     generating a histogram based on the calculated data densities of each hyper-quadrant; and
     determining a statistical difference in a data density distribution between the hyper-quadrants based on the generated histogram;
   detecting a data coverage condition based on whether the determined statistical difference exceeds a first threshold; and
   when a data coverage condition is detected:
     modifying the coverage of the data records; and
     generating a computational model indicative of interrelationships between the plurality of input parameters and the one or more output parameters based on the modified data records.

2. The method of claim 1, wherein the statistical difference is determined as a standard deviation of the data density distribution.

3. The method of claim 1, wherein evaluating the coverage of the data records further includes marking sparse hyper-quadrants with data densities below a second threshold, if the data coverage condition is identified.

4. The method of claim 1, wherein modifying the coverage of the data records further includes receiving additional data records from a user for sparse hyper-quadrants in the modeling space.

5. The method of claim 1, wherein modifying the coverage of the data records further includes removing data records from dense hyper-quadrants in the modeling space.

6. The method of claim 1, wherein modifying the coverage of the data records further includes creating additional data records for sparse hyper-quadrants in the modeling space via a symmetric random scatter process proposing input vectors of interest.

7. The method of claim 6, wherein creating the additional data records further includes:
    determining starting ranges of the plurality of input parameters;
    creating a centroid data record including midpoint values of the starting ranges of the plurality of input parameters;
    randomly creating a plurality of sample data records of the plurality of input parameters within the starting ranges of the input parameters;
    creating a plurality of SRS data records of the sample data records as symmetric scatters of the plurality of sample data records with respect to the centroid data record;
    creating the additional data records by combining the centroid data record, the sample data records, and the SRS data records; and
    removing the additional data records that fall out of the sparse hyper-quadrants.

8. The method of claim 1, further including statistically validating the computational model.

9. The method of claim 1, further including optimizing the computational model by maximizing a zeta statistic of the computational model.

10. A computer-based modeling system, comprising:
    a database containing data records related to a plurality of input variables and one or more output parameters; and
    a processor configured to:
        obtain data records relating to the plurality of input variables and one or more output parameters;
        select a plurality of input parameters from the plurality of input variables;
        evaluate a coverage of the data records in a modeling space by determining a data density of the data records in the modeling space, including:
            dividing the modeling space into a plurality of hyper-quadrants; and
            calculating the data density for each hyper-quadrant based on a number of data records in the respective hyper-quadrant;
        detecting a data coverage condition based on the determined data density of the data records in the modeling space; and
        when a data coverage condition is detected:
            modify the coverage of the data records; and
            generate a computational model indicative of interrelationships between the plurality of input parameters and the one or more output parameters based on the modified data records.

11. The computer-based modeling system of claim 10, wherein to evaluate the coverage of the data records, the processor is further configured to:
    generate a histogram based on the calculated data densities of each hyper-quadrant;
    determine a statistical difference in a data density distribution between the hyper-quadrants based on the generated histogram; and
    detect the data coverage condition when the statistical difference exceeds a first threshold.

12. The computer-based modeling system of claim 11, wherein the statistical difference is determined as a standard deviation of the data density distribution.

13. The computer-based modeling system of claim 11, wherein to evaluate the coverage of the data records, the processor is further configured to mark sparse hyper-quadrants with data densities below a second threshold, if the data coverage condition is detected.

14. The computer-based modeling system of claim 10, wherein to modify the coverage of the data records, the processor is further configured to:
    receive additional data records from a user for sparse hyper-quadrants in the modeling space;
    remove data records from dense hyper-quadrants in the modeling space; or
    create additional data records for sparse hyper-quadrants in the modeling space via a symmetric random scatter process.

15. The computer-based modeling system of claim 14, wherein to create the additional data records, the processor is further configured to:
    determine starting ranges of the plurality of input parameters;
    create a centroid data record including midpoint values of the starting ranges of the plurality of input parameters;
    randomly create a plurality of sample data records of the input parameters within the starting ranges of the plurality of input parameters;
    create a plurality of SRS data records of the sample data records as symmetric scatters of the plurality of sample data records with respect to the centroid data record;
    create the additional data records by combining the centroid data record, the sample data records, and the SRS data records; and
    remove the additional data records that fall out of the sparse hyper-quadrants.

16. The computer-based modeling system of claim 10, wherein the processor is further configured to:
    statistically validate the computational model; and
    optimize the computational model by maximizing a zeta statistic of the computational model.

17. A non-transitory computer-readable storage medium having stored thereon instructions which, when executed by a computer, cause the computer to perform a method for modifying data coverage in a modeling system, the method including:
    obtaining data records relating to a plurality of input variables and one or more output parameters;
    selecting a plurality of input parameters from the plurality of input variables;
    evaluating a coverage of the data records in a modeling space by determining a data density of the data records in the modeling space, including:
        dividing the modeling space into a plurality of hyper-quadrants; and
        calculating the data density for each hyper-quadrant based on a number of data records in the respective hyper-quadrant;

detecting a data coverage condition based on the determined data density of the data records in the modeling space; and when a data coverage condition is detected:
  prompting a user of the modeling system to select from one of a plurality of methods for modifying the coverage of the data records;
  receiving a selection from the user of one of the plurality of methods for modifying the coverage of the data records;
  modifying the coverage of the data records according to the method selected by the user; and
  generating a computational model indicative of interrelationships between a plurality of input parameters and the one or more output parameters based on the modified data records.

18. The computer readable medium of claim 17, wherein evaluating coverage of the data records further includes:
  generating a histogram based on the calculated data densities of each hyper-quadrant;
  determining a statistical difference in a data density distribution between the hyper-quadrants based on the generated histogram; and
  identifying the data coverage condition when the statistical difference exceeds a first threshold.

19. The computer readable medium of claim 17, wherein the plurality of methods for modifying coverage of the data records further include at least two of:
  receiving additional data records from a user for sparse hyper-quadrants in the modeling space;
  removing data records from dense hyper-quadrants in the modeling space; and
  creating additional data records for sparse hyper-quadrants in the modeling space via a symmetric random scatter process.

20. A method for modifying data coverage in a modeling computer system, comprising:
  obtaining data records relating to a plurality of input variables and one or more output parameters;
  dividing the data records into a plurality of hyper-quadrants in a modeling space;
  determining, by a processor of the modeling computer system, data densities of the data records in the hyper-quadrants;
  determining whether a data density of the data records in at least one of the hyper-quadrants is below a threshold; and
  when a data density of the data records in at least one of the hyper-quadrants is below the threshold:
    prompting a user of the modeling computer system to select a method to modify the data densities of the data records;
    modifying the data densities of the data records, based on the method selected by the user, to increase the data density of the data records in the at least one hyper-quadrant or to decrease the data densities of the data records in at least one of the remaining hyper-quadrants; and
    generating a computational model indicative of interrelationships between the plurality of input parameters and the one or more output parameters based on the modified data records.

* * * * *